United States Patent
Davidson

[15] 3,707,230
[45] Dec. 26, 1972

[54] METHOD AND APPARATUS FOR ULTRASONICALLY CLARIFYING LIQUID

[72] Inventor: Roger Davidson, Arlington Heights, Ill.

[73] Assignee: FMC Corporation

[22] Filed: Aug. 20, 1970

[21] Appl. No.: 65,621

[52] U.S. Cl. .....................210/77, 210/79, 210/384, 210/391, 210/DIG. 22
[51] Int. Cl. ..............................................B01d 35/20
[58] Field of Search.........210/19, 384, 391, DIG. 18, 210/DIG. 22

[56] References Cited

UNITED STATES PATENTS 3,489,679   1/1970   Davidson et al..................210/384 X Primary Examiner—Samih N. Zaharna
Attorney—Dressler, Goldsmith, Clement & Gordon

[57] ABSTRACT

The removal of organic and other solids from a dilute aqueous suspension, such as the secondary effluent from a sewage treatment plant, is accomplished by passing the effluent through a rotating fabric in a chamber, which results in depositing solids on the fabric that serves as a filter. Located within the chamber and disposed immediately adjacent the filter are ultrasonic transducers that function to remove the solids from the filter by setting up vibrations. The solids so removed are directed through a solids discharge pipe positioned adjacent the transducers. The transducer can be located in a number of positions within the chamber outside the drum, such as (1) below the level of the contaminated stream, but above the level of the clarified liquid and (2) below the liquid level of the clarified stream, or inside the drum. In the latter two positions, clarified liquid may move outwardly to assist in carrying away the solids removed from the screen.

3 Claims, 4 Drawing Figures

PATENTED DEC 26 1972

3,707,230

TRANSDUCER

Inventor:
Roger Davidson
By Dressler, Goldsmith,
Clement & Gordon
Atty's

METHOD AND APPARATUS FOR ULTRASONICALLY CLARIFYING LIQUID This invention relates generally to the removal of matter from a moving filter and, more particularly, to the removal of solids deposited on a moving drum-type filter, in a clarifying apparatus of the type disclosed in U.S. Pat. No. 3,489,679 and copending application Ser. No. 794,511, filed 1-28-69, and now abandoned, both of which are assigned to the assignee of the present invention.

The particular apparatus forming the present invention finds particular application in the clarification of liquids containing minute particles of suspended solids, including organic materials, which are normally difficult to remove from a liquid, such as sewage.

For example, the secondary effluent from an activated sludge sewage treatment plant has suspended therein colloidal, biological and bacteriological solids in amounts of about 20–40 ppm which, when discharged into a stream, lake, or the like, consume oxygen from the receiving water while undergoing decomposition therein, and thus have an adverse effect on the animal life in the water. Also, these organic materials serve as nutrients for plant growth in the receiving water, thereby creating clogging and other problems.

The present invention is capable of clarifying these secondary effluents to provide waste liquids containing about 8-10 ppm, and even less, of these solids, which under present standards are acceptable for discharge into streams, rivers, and lakes where control and preservation of animal and marine life is important.

The volumes of effluent from an activated sludge sewage treatment plant are large, even in a small city or municipality, and land values in the zone of the treatment plant are generally such that it is much too costly to provide contiguous large area tertiary sewage treatment facilities. The problem is further complicated by the variable climates at the plant sites in different parts of the country. The apparatus of the present invention is relatively small and may be housed in a small shelter, or a relatively small area of an existing building, and since it can handle clarification of large volumes of secondary effluent from an activated sludge sewage treatment process, for example, it presents substantial economic advantages when used for clarification of the kinds of liquids herein contemplated.

In the embodiments illustrated in the two aforementioned disclosures, there is employed a double compartment, with the first or main compartment containing a drum on which is disposed a continuous screen that rotates therein and on which solids from an incoming effluent are deposited. In both cases, after the solids are deposited thereon, the solids-laden filter fabric is directed into a second, smaller compartment, where the solids deposited on the fabric are removed therefrom by the use of ultrasonic transducers. These embodiments, while effective, require double tanks and present other disadvantages which are attendant therewith.

The present invention employs a submerged ultrasonic cleaner which is disposed very close to the fabric and when properly adjusted with respect to the surface of the liquid results in a minimum amount of liquid being transmitted away from the tank to provide for adequate flow of the loosened solids to a discharge area. This results in optimum performance of the process and decreases, or eliminates the possibility of contamination of the clarified stream by the ultrasonically homogenized solids, which have been directed away therefrom.

In a preferred embodiment, this invention makes use of a pressure head set up between the effluent and the clarified liquid, with the transducers being located above the level of the clarified liquid. The air located on the opposite side of the loaded fabric from where the transducer is positioned acts as a natural reflector of sound energy, which provides beneficial effects to the process by reflecting the energy, thereby yielding a high energy focal point onto the fabric surface to which the solids are hinged, thereby aiding in loosening of the solids.

In essence, the fabric serves as a reflector surface.

An ultrasonic transducer of the type that would be used would preferably be one having a blade, horn, or tip of a proper design, so as to provide a small area of intense ultrasonic energy at the fabric surface for removing the solids from the fabric. By keeping the area small and properly focused, a high energy level could be obtained with less power required for effective ultrasonic energy production than would be necessary if the energy were radiating from a broad surface. A plurality of such transducers could be located along the surface of the drum, if such is desired. The invention covered herein is, of course, not limited to any particular type of transducer, as other designs could be employed.

An alternate location for the transducers would be to locate them close to the drum, but below the surface of the clarified liquid within the drum. This position may be desirable in that during cleaning a portion of the clarified liquid within the drum could be withdrawn through the fabric past the cleaner tip, thereby preventing any possibility of contaminating the clarified liquid.

A second alternate position would be to locate the transducer in a submerged position very close to the fabric, but on the inside of the drum. By proper arrangement of an enclosure outside the drum, the clarified liquid could be withdrawn through the fabric and into the enclosure from where the loosened solids are transported out of the system. If desired, a sealing arrangement could be employed at the entrance to the cleaning enclosure to provide a water-tight seal between the fabric and the enclosure. Placing a sealing edge on the enclosure would provide more complete control over the amount of liquid that would be necessary for adequate transportation of solids away from the fabric.

The drawings have been illustrated in schematic form to show the three embodiments above referred to.

Referring particularly thereto, it is seen that,

It is to be noted that the drum and traveling screen have been illustrated in schematic form and that various conventional drive means could be employed for rotating them at a given speed. Various details of the tank, drum, and other pertinent mechanisms can be seen by referring to the two aforementioned applications. It is sufficient to note that the various components of the apparatus referred to in the subject applications are designed so that the water level of the clarified liquid within the drum is below that of the effluent within the main tank by a distance or head $h$ which is sufficient to provide the driving force necessary to cause effluent flow through the screens. Also, for a given mesh screen, they are rotated at a speed adequate to maintain the head $h$. Should the screen become plugged, this would be indicated by an increase in the head $h$.

Figure 1:
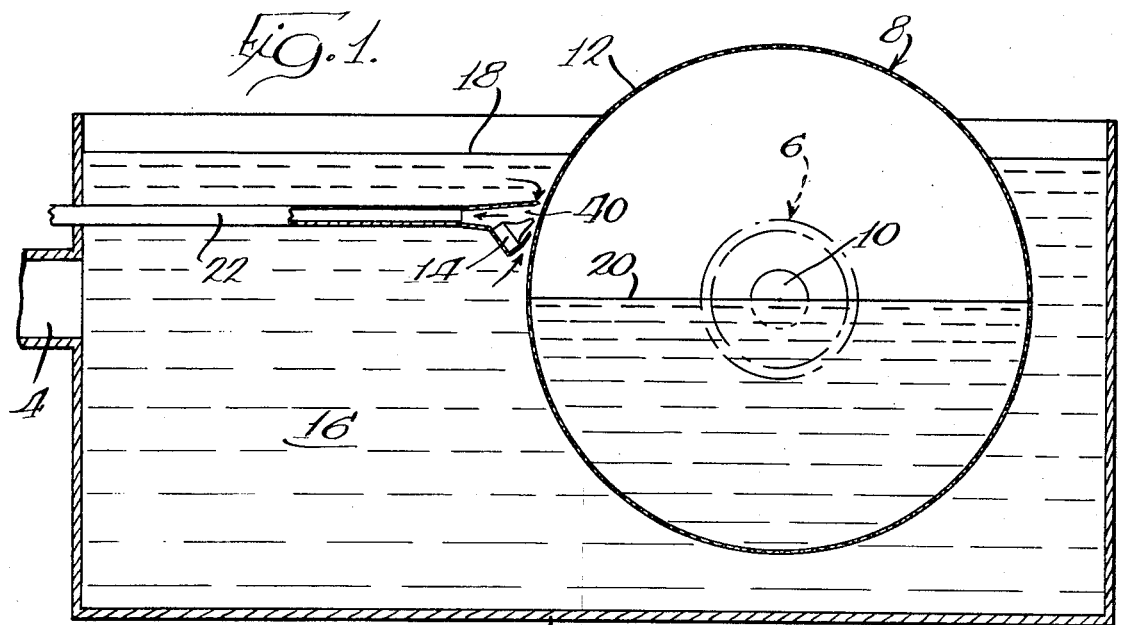
FIG. 1 illustrates a drum type system wherein the transducer is located outside the drum but above the liquid level of the clarified liquid within the drum.

As shown in FIG. 1, there is illustrated a tank 2 having an inlet 4 for plant effluent and an outlet 6 for clarified liquid. In tank 2, a drum, having an axle 10, is located and about the drum is disposed a screen 12. As previously mentioned, the drum may be driven by any of a variety of conventional means, such as the mechanism shown in the aforementioned Davidson et al. Pat. No. 3,489,679.

In the illustrated embodiment, the screen for the drum 8 is a fabric 12, a suitable material for which may be a filter cloth designated monofilament screen cloth PE20. The weave is 260 × 400 meshes/inch; the hole size is nominally 20 microns; and the open area is 6 percent of the cloth surface. In the preferred embodiment shown in FIG. 1, an ultrasonic transducer 14 of a horn type is shown located in the effluent 16 immediately adjacent the fabric 12, but at a level in the tank between the level 18 of the effluent and the level 20 of the clarified liquid. The transducer acts to loosen materials from the fabric and the head of effluent acts to direct the liquids away from the fabric past the transducer 14 into the discharge pipe 22 and out to a suitable collector (not shown).

Figure 4:
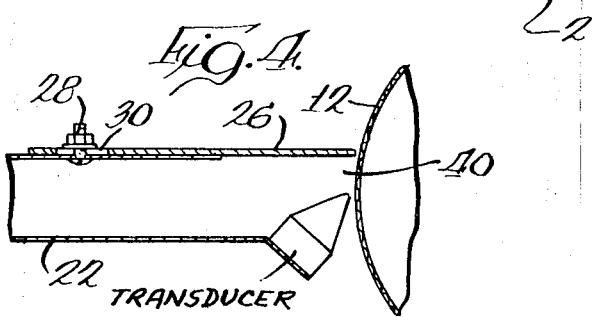
FIG. 4 is an embodiment wherein the flow area between the drum and discharge size is controlled by an adjustable plate.

The enclosure 40 for transducer 14 is placed very close to the fabric 12 and this relationship in conjunction with its position relative to the level 18 of the effluent is designed so that a minimum amount of liquid is used to provide adequate flow for directing the loosened solids away from the fabric 12 past the transducer 14 into the discharge pipe 22 and out of the system. The spacing is designed to allow enough flow past the ultrasonic cleaner to interrupt the normal flow direction, which is into the interior of the drum. By providing this proper amount of flow, the possibility of contamination of the clarified stream by the ultrasonically homogenized solids passing into the interior of the drum is decreased, or eliminated. The system is essentially designed to eliminate withdrawal of clarified liquid. As shown in FIG. 4, the spacing of enclosure 40 between the drum and discharge pipe can be controlled by providing an adjustable plate 26 in the upper region of the discharge pipe 22. The position of the plate is controlled by fastening means 28 which extends through slot 30.

The design of the ultrasonic transducers is not critical to the present invention with transducers suitable for the application of the present invention being commercially available. However, it is to be noted that it may be advantageous to provide a hollow core, or another type of reflector as a housing around the transducer to aid in its cleaning and to decrease the escape of the sound energy onto the fabric around the transducer other than in the desired location.

When the transducer is located at this juncture, the air on the opposite side of the loaded fabric from where the transducer is located acts as a natural reflector of sound energy, which provides beneficial effects to the process by reflecting the energy, thereby yielding a high energy concentration to the fabric surface on which the solids are deposited, thereby aiding in loosing of the solids.

A simple box-type weir and baffle assembly (not shown) may be provided at the clarified effluent outlet for adjusting the head $h$ across the screen within the main tank. The weir plate would be adjusted so that the water level of the clarified effluent is below the water level of the effluent within the main tank by a distance sufficient to provide the driving force necessary to cause effluent flow through the screen and into the interior of the drum. As previously mentioned, the drum is rotated at a speed adequate to maintain the head $h$ and solid organic and other materials in suspension in the effluent are removed from the screen by the ultrasonic transducer.

Figure 2:
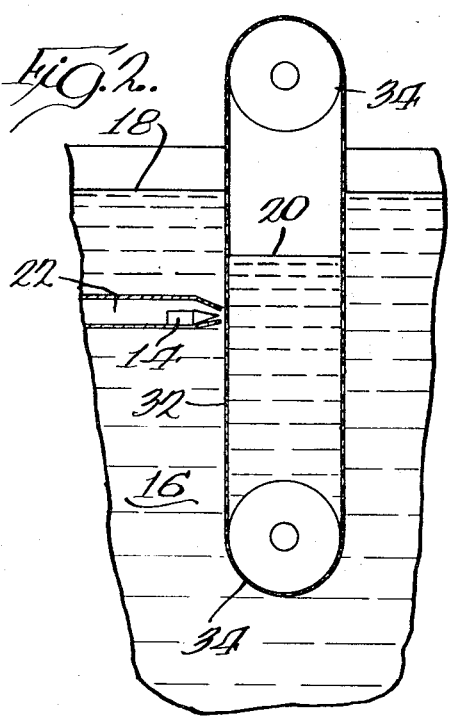
FIG. 2 shows a system employing a traveling screen, wherein the transducer is located below the level of the clarified liquid.

In the embodiment shown in FIG. 2, there is illustrated a traveling screen 32 disposed over rollers 34 at least one of which is driven by any of a number of conventional drive mechanisms which do not form part of the present invention. The transducers are located in the effluent 16, but below the level 20 of the clarified liquid. In this way, some clarified liquid by-passes the transducer 14 and flows out the discharge pipe 22. This position may be desirable in that, during cleaning, a portion of the clarified liquid within the drum could be withdrawn through the fabric past the transducer tip, thereby preventing any possibility of contaminating the clarified liquid.

Figure 3:
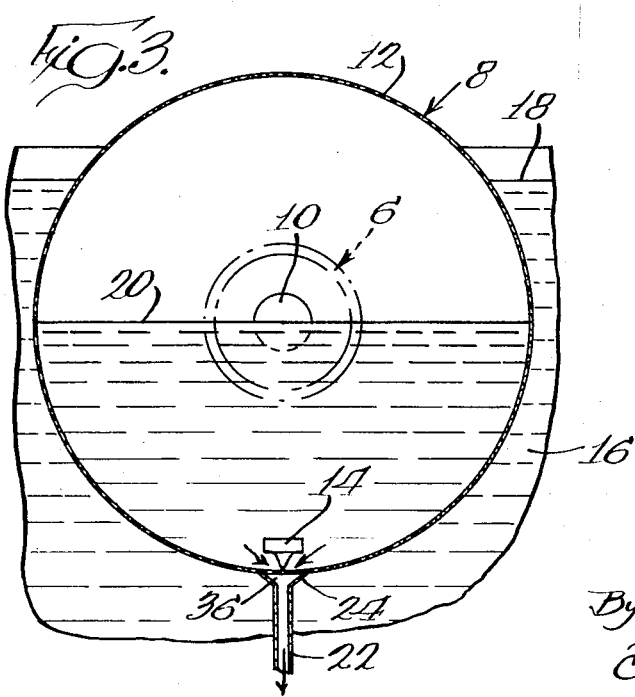
FIG. 3 shows a transducer located inside a drum, wherein clarified liquid is directed outwardly through a discharge tube.

In the embodiment shown in FIG. 3, the transducer 14 is located in the submerged position and very close to the fabric on the inside of the drum. A sealing arrangement 24 located at the entrance to the cleaning enclosure 36 is provided to provide a water-tight seal between the fabric and the effluent in the chamber 16. The sealing edge on the enclosure provides more complete control over the amount of liquid that is necessary to direct the loosened solids away from the fabric.

In operation, a liquid contaminated with solids, such as effluent, is passed through the fabric 12 on the drum 8, or screen 32, with the solids being trapped in and on the fabric 12, or on the screen 32. The screen or fabric is rotated past the submerged ultrasonic transducer 14 located within the enclosure 40, the operation of which loosens the solids located on the screen or fabric. As solids are loosened, the flow of liquid around the transducer tip and through the enclosure moves the loosened solids out of the system.

While there has been illustrated a preferred and several additional embodiments in the drawings, it is, of course, within the scope of the invention to provide modifications and variations thereof which fall within the terms of the claims.

What is claimed is:

1. The method of removing solids from an aqueous suspension of the same in a tank having an inlet for said suspension and an outlet for clarified aqueous medium, wherein an endless moving screen having openings smaller than at least some of the solids travels within the tank to filter solids in the suspension traveling between the inlet and outlet, comprising flowing the said aqueous suspension through the inlet into the tank and through the screen and simultaneously withdrawing clarified medium which has passed through the screen from the tank through the tank outlet, thereby depositing suspended solids on said screen, subjecting the aqueous suspension adjacent the screen to ultrasonic vibrations at an area in the lower portion of the screen to impart to the deposited solids loosening forces, thereby dislodging the solids from the screen and withdrawing the solids through a discharge opening located immediately adjacent the area which is subjected to the ultrasonic vibrations to thereby remove the solids from the aqueous suspension in the tank, and sealing off the discharge area from the aqueous suspension to facilitate control of the aqueous suspension removed from the tank.

2. Apparatus for removing solids from an aqueous suspension of the same in a tank having an inlet for said aqueous suspension and an outlet for clarified aqueous medium, means for maintaining a difference in level between the aqueous suspension and the clarified medium, a rotatably driven drum in said tank, screen means mounted about said drum in said tank between the inlet and outlet and positioned to filter out solids as the suspension flows therebetween, ultrasonic means disposed adjacent the screen in said tank adjacent the lower region of the drum for removing solids disposed thereon, means disposed immediately adjacent said ultrasonic means for directing the solids loosened from the screen outwardly from the tank and means for providing a seal between said screen and the means for directing the solids loosened from this screen outwardly from said tank to more accurately control the amount of aqueous suspension used for directing the solids away from the screen.

3. Apparatus for removing solids from an aqueous suspension of the same in a tank having an inlet for said aqueous suspension and an outlet for clarified aqueous medium, movable screen means mounted in said tank between the inlet and outlet and positioned to filter out solids as the suspension flows therebetween, ultrasonic means disposed adjacent the screen in said tank for removing solids disposed thereon and means disposed adjacent said ultrasonic means for directing the solids loosened from said screen outwardly from said tank including a discharge pipe which has an adjustable portion that can be positioned to regulate the spacing between the pipe and the screen means to control the amount of aqueous suspension that will flow out of the discharge pipe.

* * * * *